Nov. 18, 1947.  H. NOYES  2,430,884

SELF-LOCKING NUT

Filed Feb. 19, 1946

INVENTOR.
HOWARD NOYES

BY
Raymond J. Crowley
— HIS ATTORNEYS —

Patented Nov. 18, 1947

2,430,884

UNITED STATES PATENT OFFICE 2,430,884

SELF-LOCKING NUT

Howard Noyes, Dayton, Ohio

Application February 19, 1946, Serial No. 648,805

10 Claims. (Cl. 151—14)

(Granted under the act of March 3, 1883, as amended April 30, 1928; 370 O. G. 757)

The invention described herein may be manufactured and used by or for the Government for governmental purposes without payment to me of any royalty thereon.

This invention relates to a self-locking nut for threaded association with a screw threaded bolt or stud.

The primary object of the invention is to provide a self-locking nut having a self-contained bolt gripping means adapted to frictionally retain a bolt and nut in fixed relative position.

Another object of the invention is to provide a nut locking means which is so constructed as to take effect upon tightening the nut into holding engagement with a plate or other member to be fastened.

A further object of the invention is to provide a nut locking means constructed of sheet metal and including bolt engaging portions which are adapted to firmly grip the bolt without danger of mutilating the bolt threads.

The above and other objects of the invention will become apparent upon reading the following detailed description in connection with accompanying drawing, in which.

Figure 1:
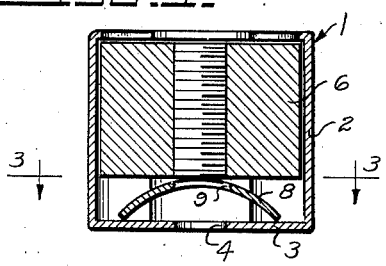
Fig. 1 is a cross-sectional view of a preferred form of self-locking nut, the view being taken on line 1—1 of Fig. 2.
Figure 2:
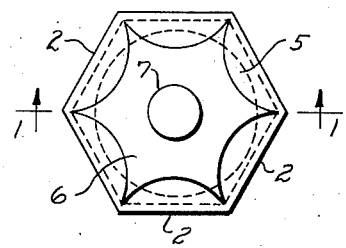
Fig. 2 is a top plan view of the preferred form of self-locking nut.

The preferred form of self-locking nut as shown in Figs. 1 to 4 comprises a sheet metal cage or retainer 1 having side walls 2 closely fitting the nut, which is shown as being of hexagonal shape but which may be of any desired form. The retainer is of generally cup-shaped configuration having a bottom wall 3 apertured centrally at 4 and the cup being partially closed at the top by means of a scalloped edge, forming tongues 5. Retained within the cage 1 by means of the tongues 5 there is a nut 6 having the usual threaded central aperture, and the nut being shorter along the direction of its central axis than the cage 1 is thus adapted to have a limited sliding movement within the cage or retainer.

Figure 3A:
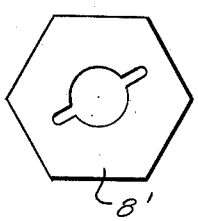
Fig. 3a is a plan view of a modified washer element.
Figure 3:
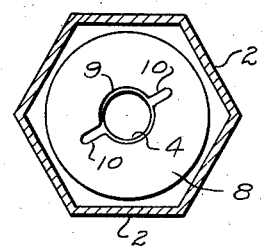
Fig. 3 is a cross-sectional view taken on line 3—3 of Fig. 1.
Figure 4:
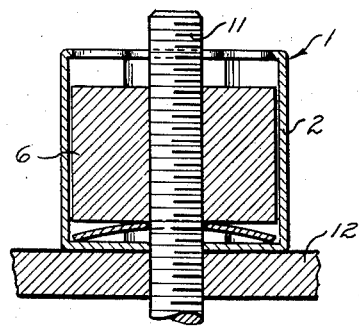
Fig. 4 is a view similar to Fig. 1 but showing the self-locking nut in association with a bolt shank and a plate.

Situated between the nut 6 and the bottom wall 3 of cage 1 there is a convex spring washer or diaphragm 8 having a central aperture 9, slightly larger in diameter than the central aperture 7 in the nut 6. The aperture 9 in the washer is preferably notched at 10 to provide a more resilient construction and to provide edge portions within said aperture which may more readily conform to the thread grooves of the bolt, as indicated at 11 in Fig. 4. The exact number of notches provided is not significant but for the purpose of illustration Fig. 3 shows two such notches. The aperture 9 in the washer is also formed with slightly beveled edge portions allowing the portions to fit more readily into the thread grooves of the bolt. While the washer may be of any suitable sheet material having some degree of resilience, the material is preferably a hard metal such as steel or phosphor bronze so as to be sufficiently durable, and not subject to buckling under high compressive stress encountered in the present devices. The edges of aperture 9 being beveled, they are capable of fitting within the thread grooves of the associated bolt so as not to cause any mutilation of the threads. At the same time this affords more extensive contact and provides a better frictional grip on the bolt threads.

In use (see Fig. 4) the self-locking nut may be applied to a bolt shank 11 which extends through a plate or other member 12. As the self-locking nut is tightened down on the plate, the nut element 6 slides downward within the cage 1 thus causing a gradual flattening of the washer 8. As the washer assumes a flat or planar form the edge portions of aperture 9 between the notches 10 are forced closer together to gradually take a firm grip on bolt shank 11. This gripping action reaches a maximum when the washer 8 is completely flattened by the downward movement of the nut element 6. While the bolt threads have a definite pitch or slope, it has been found that each of the edge portions of aperture 9 fits into and assumes the pitch of a selected thread groove causing no cutting or mutilation of the bolt threads. In using a wrench on the self-locking nut, the same is applied to the outside walls 2 of the cage 1 and since these walls are backed up by the nut element 6 the wrench or other tool if properly applied will not bend, dent or otherwise damage the walls of the cage.

In further explanation of the operation and use of the self-locking nut it is noted that as soon as the washer 8 is flattened enough to grip the bolt shank 11, the washer may continue to rotate with the cage and nut element because of the frictional engagement with these elements. To insure the washer rotation with respect to the bolt shank the washer may be in the form of a hexagon or other noncircular shape, to cause the washer to engage portions of the walls 2 of cage 1 and thus force the washer to turn with the cage. Thus the bolt gripping edge portions of the washer aperture will initially grip certain thread grooves and will thread downwardly along the bolt shank just as the nut element itself. The washer of hexagonal outline is shown at 8' in Fig. 3a and aside from its outer contour is no different than the washer 8 of Fig. 3.

Figure 5:
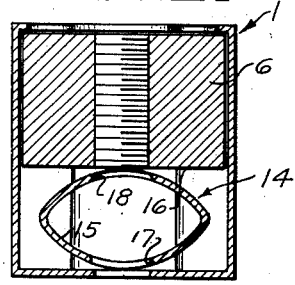
Fig. 5 is a cross-sectional view of a modified form of self-locking nut.

Considering now the self-locking nut of Fig. 5, the cage 1 and nut element 6 have the same general form and slidably interfitting association. However the bolt gripping washer 14 in this construction comprises two opposite convex sheet metal portions 15 and 16 apertured at 17 and 18 to receive the bolt shank. As in the form illustrated in Figs. 1 to 4, the apertures 17 and 18 are slightly larger in diameter than the bolt shank, and the edges of the apertures are also preferably notched similarly to the notches 10 as shown in Fig. 3. The two convex portions 15 and 16 are integrally connected at their circular peripheral edges, and the complete washer may be made from two separate convex discs welded together, or by a rolling operation may be formed from a short length of tubing. Also it should be noted that the edge portions of apertures 17 and 18 are preferably beveled to form sharp edges which are adapted to take into the thread grooves of the bolt, when the self-locking nut is brought into securing relation to cause flattening of the opposite portions 15 and 16. In the construction of Fig. 5 the washer or diaphragm disclosed will have added gripping action on the bolt over that of the previously described form, since there are two apertures 17 and 18 instead of a single aperture 9.

Figure 6:
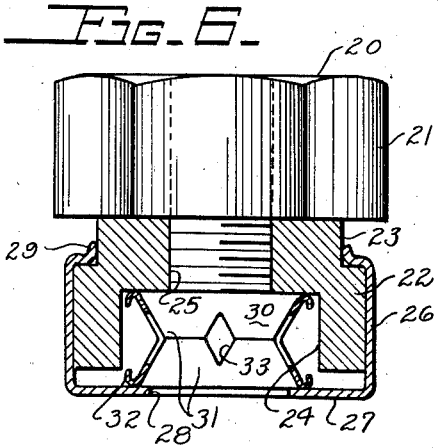
Fig. 6 is a cross-sectional view of another modified form of self-locking nut.

Referring to Fig. 6 the form of self-locking nut illustrated comprises a nut element 20 having a hexagonal head portion 21 and having a circular lower portion 22, which is circumferentially grooved at 23 just below the head portion 21. At the lower face of the circular portion 22 there is a counterbore 24 concentric with the threaded opening 25 to receive a special thread gripping washer, to be described hereinbelow. The washer is retained within the counterbore 24 by means of a sheet metal cage or retainer 26 of cup-shaped form having a bottom wall 27 apertured at 28 and having an inturned peripheral top edge 29 fitting closely within the circumferential groove 23. The cage 26 is capable of a limited sliding movement on the circular lower portion 22 of nut element 20, as the bolt gripping washer is compressed.

In the present form of self-locking nut the resilient sheet metal bolt gripping washer 30 comprises an integral structure made up of two oppositely facing frusto-conical portions 31 connected at their smaller ends to form double-bevel bolt gripping portions, similar to the edge portions of the washer apertures as previously described in connection with Figs. 1 to 5. The washer 30 has rolled over upper and lower peripheral edges 32 to strengthen the washer structure and prevent rupture thereof. The conical portions 31 are also preferably apertured as indicated at 33, and as shown these apertures may be located at 90° intervals around the washer. These apertures give the sheet metal gripping washer added resilience, and also provide circumferentially spaced edge portions adapted to fit into thread grooves of the bolt independently of each other.

In use the self-locking nut of Fig. 6 is threaded downwardly onto a bolt shank and when the bottom wall 27 of cage 26 reaches a plate or member to be held down, the washer 30 is deformed sufficiently to cause the conical portions 31 to bulge inwardly and force the double-bevel bolt gripping edge portions into firm holding engagement with the bolt shank. When the nut is fully tightened down the bottom wall 27 of cage 26 contacts the lower face of portion 22 of the nut, and the washer 30 is completely contained within the counterbore 24 of the nut portion 22. As the washer 30 becomes compressed into bolt engaging relation, the apertures 33 narrow slightly in a circumferential direction thus allowing the double-bevel gripping portions to move inwardly and grip the bolt shank.

In Fig. 6 the structural arrangement of the cage element and nut element is slightly different than in Figs. 1 to 5, but it should be understood that the washer of Fig. 6 may be used with a cage and nut assembly as illustrated in Figs. 1 to 5, and conversely the washers of Figs. 1 to 5 may be used with a cage and nut assembly as illustrated in Fig. 6.

The embodiments of the invention herein shown and described are to be regarded as illustrative only and it is to be understood that the invention is susceptible to variations, modifications and changes within the scope of the appended claims.

What I claim is:

1. A self-locking nut comprising a nut element having a threaded central aperture, a cage element in peripherally surrounding relation with respect to said nut element and being slidably mounted thereon, said cage element having a centrally apertured bottom wall movable toward and away from said nut element, a sheet metal washer between said nut element and said bottom wall, said washer having an outer rim in contact with said bottom wall and having wall portions extending away from said rim toward the central aperture in said washer and toward the nut element to form an inner bolt engageable edge, adapted to grip said bolt as said wall portions are displaced toward said bolt by axial compression of said washer.

2. A self-locking nut comprising a nut element having a threaded central aperture, a cage element in peripherally surrounding relation with respect to said nut element and having limited axial sliding movement thereon, said cage element having a centrally apertured bottom wall movable toward and away from said nut element, a sheet metal washer between said nut element and said bottom wall, said washer having at one side an outer rim and having wall portions of uniform thickness extending away from said rim toward the central aperture in said washer and away from the plane of said rim to form an inner bolt engageable edge, adapted to grip said bolt as said wall portions are displaced toward said bolt by axial compression of said washer.

3. A self-locking nut comprising a nut element having a threaded central aperture, a cage element in surrounding relation with respect to said nut element and being slidably and non-rotatably mounted thereon, said cage element having a centrally apertured bottom wall movable toward and away from said nut element, a convex washer between said nut element and bottom wall with the outer rim portion of said washer in contact with said bottom wall, and a central aperture in said washer providing a circular edge adapted to grip a bolt element upon compression of said washer.

4. A self-locking nut comprising a nut element having a threaded central aperture, a cage element in surrounding relation with respect to said nut element and being slidably and non-rotatably mounted thereon, said cage element having a centrally apertured bottom wall movable toward and away from said nut element, a convex resilient washer between said nut element and bottom wall and having a central aperture slightly larger than the central aperture of said nut element, the washer aperture having a notched edge to provide spaced edge portions adapted to grip a bolt element upon compression of said washer.

5. A self-locking nut comprising a nut element having a threaded central aperture, a cage element in surrounding relation with respect to said nut element and being slidably and non-rotatably mounted thereon, said cage element having a centrally apertured bottom wall movable toward and away from said nut element, a convex resilient washer between said nut element and bottom wall and having a beveled central aperture slightly larger than the central aperture of said nut element, the washer aperture being radially notched to provide spaced edge portions adapted to enter the thread grooves of a bolt element upon application of axial pressure to said washer by said nut element and bottom wall, as said self-locking nut is threaded onto said bolt element and brought to a securing position thereon.

6. A self-locking nut comprising a nut element of noncircular cross-sectional shape having a threaded central aperture, a cage element surrounding and containing said nut element and having a cross-sectional shape corresponding to that of the nut element, said cage element having a centrally apertured bottom wall movable toward and away from said nut element, a convex resilient washer between said nut element and bottom wall and having a rim portion resting on said bottom wall, there being a central aperture in said washer slightly larger than the central aperture of said nut element, the washer aperture having a notched edge to provide spaced edge portions adapted to grip a threaded bolt element upon compression of said washer between said nut element and bottom wall.

7. A self-locking nut comprising a nut element having a circumferential groove therein, a cage element having an upper edge extending into said groove and having an apertured bottom wall, said cage element having limited sliding movement relative to said nut element axially thereof, a resilient washer between a lower face of said nut element and said bottom wall of the cage element, said washer comprising a pair of frusto-conical sheet metal portions joined at their smaller ends to form a circular edge of minimum diameter, there being apertures in said washer along said circular edge and extending into said frusto-conical portions to provide spaced edge portions for gripping a bolt member upon axial compression of said washer.

8. A self-locking nut comprising a nut element having a threaded central aperture, a cage element in surrounding relation with respect to said nut element and being slidably mounted thereon, said cage element having a centrally apertured bottom wall movable toward and away from said nut element, a resilient washer between said nut element and said bottom wall, said washer comprising a pair of convex sheet metal portions joined at their outer rims, a central aperture in each of said portions to provide a pair of circular bolt gripping portions adapted to frictionally retain the self-locking nut on an associated bolt upon compression of said washer between said nut element and said bottom wall.

9. A self-locking nut comprising a nut element having a threaded central aperture, a dished washer of resilient sheet metal located in contiguous relation to one end face of the nut and adapted to be flattened as the nut is tightened against a flat surface, said washer having a central aperture concentric with the nut element aperture and of slightly larger diameter, said washer aperture forming a circular edge adapted to grip a threaded bolt shank associated with said self-locking nut as said washer is flattened, and means on said nut element for holding said washer in connected relation with said nut element.

10. A self-locking nut comprising a nut element having a threaded central aperture, a dished washer of resilient sheet metal located adjacent to one end face of the nut and adapted to be flattened as the nut is tightened against a flat surface, said washer having a central aperture slightly larger than the nut element aperture, the washer aperture being radially notched along the edge to provide spaced edge portions adapted to grip a threaded bolt shank associated with said self-locking nut as said washer is flattened, and means for retaining said washer and nut element in permanently connected relation.

HOWARD NOYES.